Figure 1:
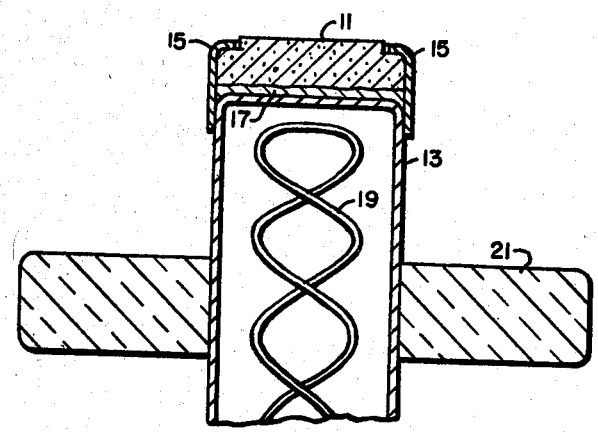

July 19, 1960

G. R. FEASTER 2,945,295

HIGH TEMPERATURE METALLIC JOINT

Filed Dec. 20, 1957

WITNESSES:
Bernard R. Gieguey
Robert C. Baird

INVENTOR
Gene R. Feaster
BY Homer O. Blair
ATTORNEY

United States Patent Office 2,945,295
Patented July 19, 1960

2,945,295

HIGH TEMPERATURE METALLIC JOINT

Gene R. Feaster, Horseheads, N.Y., assignor to Westinghouse Electric Corporation, East Pittsburgh, Pa., a corporation of Pennsylvania Filed Dec. 20, 1957, Ser. No. 704,155

3 Claims. (Cl. 29—494)

This invention relates to joining one metal to another metal by a high temperature metallic joint and, more particularly, relates to a joint between a porous metal matrix and a support member for use in a matrix cathode in an electron discharge device.

Recently it has been found that the so-called "matrix," "dispenser" and "L-type" cathodes have considerable use with electron discharge devices such as disc seal tubes, cathode ray tubes, vidicons, image orthicons, etc., In cathodes of this type, a porous metal matrix is impregnated by various methods with a material which is, or may be treated to become, an electron emissive material. The metal matrix must be joined to a metallic support structure which, in turn, is heated by a heater. One of the difficult problems with matrix cathodes has been in obtaining a good thermal contact between the metal matrix and the metallic support structure. This lack of good thermal contact results in lower cathode temperatures and in a time lag in reaching temperature equilibrium. In some cases, the metal matrix has been formed by pressing the metal powder into place in a supporting structure and subsequently firing in a non-oxidizing atmosphere. However, even in this case the thermal contact is not good. This is evidenced by the fact that good adherence is not obtained. It is possible that if one could fire a metal powder at a high temperature, one would get adherence, but this high temperature firing would also reduce the porosity of the matrix to an undesirable extent.

It is also possible that the poor thermal contact between the metal matrix and the support structure could be avoided by brazing the matrix to the support structure. However, no ordinary brazing material will work for two reasons. First, in order to maintain a good joint during the operation of the cathode, the brazing material must melt at a higher temperature than that reached during the processing of the impregnated matrix (which is approximately 1200° C.), but, if the matrix is fired much higher than 1000° C. during preparation of the brazing joint, the matrix will lose porosity to an extent which makes it impossible to fill with a sufficient quantity of emitting material. Second, the brazing material must become fluid in order to form a braze joint and any fluid would probably be drawn into the porous matrix by capillary action.

It is a general object of this invention to avoid and overcome the foregoing and other difficulties and objections to prior art practices by the use of a metal oxide such as nickel oxide as a brazing material with the proper treatment as explained below. This material and other materials have the peculiar property of effecting a bond without melting when fired in a reducing atmosphere at a comparatively low temperature. Since there is no melting, there is no problem of the disappearance of a fluid brazing medium into the pores of the matrix.

It is another object of this invention to provide an improved high-melting-point metal joint between metal members.

It is a further object of this invention to provide an improved high-temperature metal joint between a porous metal member and another metal member.

It is an additional object to provide an improved metal joint between a porous metal matrix and a metallic support member which is adaptable for use in a matrix cathode in an electron discharge device.

An auxiliary object is to provide an improved, thermionic, matrix cathode.

It is a supplementary object to provide methods for accomplishing the above objects.

Figure 2:
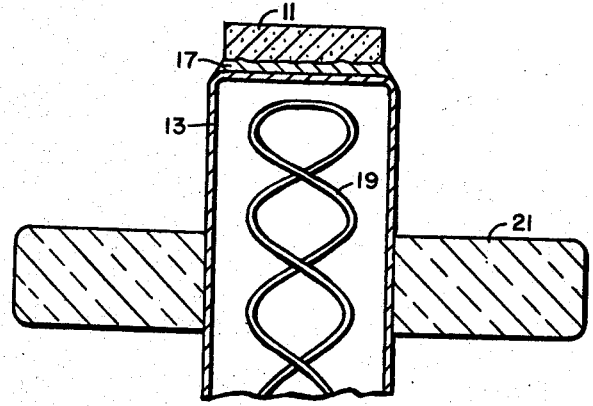

These and other objects of this invention will be apparent from the following description, taken in accordance with the accompanying drawing, throughout which like reference characters indicate like parts, which drawing forms a part of this application, and in which Figure 1 is a sectional view of a matrix cathode constructed in accordance with one embodiment of my invention; and Fig. 2 is a sectional view of a matrix cathode constructed in accordance with another embodiment of my invention.

Although the problems of this invention are broadly applicable to joining metal members together by means of a metal joint, the invention may be suitably used in the brazing of matrix thermionic cathodes, and therefore is so illustrated and will be so described with respect to the form of the invention, wherein, in Fig. 1 of the drawing, there is shown a metallic support member 13 and a porous metal matrix member 11 which is joined to said support member 13 and a metal bond or joint portion 17. In this particular embodiment, there is also shown a heater filament 19 which may be used to heat the metal sleeve member 13 and, in turn, the porous metal matrix member 11. A spacer member 21 is shown surrounding the metallic support member 13 for use in mounting the cathode shown in this particular embodiment. The spacer member may be made of a suitable insulative material such as ceramic material. Also shown is a metallic cap member 15. The porous metal matrix member 11 may be made of a metal such as nickel, cobalt, iron or a more refractory metal and may be formed by various methods well known in the art of powder metallurgy, such as sintering metallic powder particles in the presence of a non-oxidizing atmosphere either as molded or actually in a mold or under pressure. The metallic support member 13 may be made of any suitable metal such as various nickel alloys. In a particular embodiment shown in Fig. 1, we have found that a suitable material of which a matrix member 11 may be made includes 99.8% nickel and 0.2% silicon. The metallic support member 13 may be made from ASTM cathode alloys such as grade 21 which has a nominal analysis of 99.40% nickel, 0.10% cobalt, 0.002% titanium, 0.005% sulphur, 0.01% silicon, 0.005% magnesium, 0.03% carbon, 0.005% manganese, 0.03% iron and 0.01% copper. A suitable braze material may be a mixture of 100 grams of nickelic oxide with 400 milliliters of a removable organic binder material such as that known as B-10. The composition of this B-10 binder is 64.5 grams wet weight of a solution of 65% nitrocellulose and 35% alcohol, having a viscosity of 60–80 seconds; 1950 milliliters of diatol (principally diethyl carbonate); and 850 milliliters of diethyl oxalate.

This mixture or slurry is sprayed, dipped, or otherwise coated onto one or both of the parts to be brazed and the parts are then brought into contact while the slurry is still wet. One should be careful not to press or fit the parts to be joined together so closely that the slurry is extruded from the braze area. The parts are allowed to dry in this position; of course, heating can be used to accelerate this drying. After drying, the coating weight will be found to be about 20 milligrams per square centimeter. After the drying process is completed the parts will be stuck together by the nitrocellulose and may be fired at the convenience of the operator.

The parts may be fired in a non-oxidizing and reducing atmosphere such as cracked ammonia or hydrogen for approximately ten minutes at a temperature of 700° C. after which a braze having a thickness of approximately 0.002 inch will be found. Of course, it will be appreciated that the firing times, temperature and composition of the firing atmosphere may be varied considerably and that the slurry composition and the method of applying the slurry may also be varied.

It has been found that although the nickel oxide at no time becomes fluid during the firing process, a strong bond is formed. It is thought that when the nickelic oxide or other suitable oxide is fired in the reducing atmosphere and is reduced to its metallic state, nickel in this case, the metal formed is in a highly active state (nascent nickel) and bonds to the porous metal matrix and the support member at the firing temperature. Other metals than nickel, cobalt or iron and their combinations may be used for the porous metal matrix. For example, suitable metals include tungsten, molybdenum and various combinations of these and other metals, suitable to the desired application. Also the composition of the braze material may be varied over a wide range and with various materials with the main requirement being that it may be heated in a reducing atmosphere to give the free metal in statu nascendi. When the invention is used in a cathode as described above an additional requirement is that no harmful element be added to the cathode which would cause failure in an electron discharge device.

While nickel and cobalt oxides are more suitable in this particular cathode application, iron oxides, as well as nickel and cobalt oxides, may be used in other applications, such as forming high temperature joints between porous metals, between solid metals or between a porous metal and a solid metal. My invention is particularly useful also in sequential brazing because a subsequent brazing operation does not cause melting and loosening of a previous braze joint.

Particular dimensions which we have found suitable in Fig. 1 are the metal matrix member 11 having a diameter of 0.120 inch and a depth of 0.030 inch, the metallic support member 13 having a diameter of 0.120 inch, the spacer member 21 being positioned at 0.100 inch from the braze joint 17 at the end of the metallic support member 13.

In some instances, it may be desirable to omit the metallic cap member 15 shown in Fig. 1 thereby resulting in a cathode such as that shown in Fig. 2, in which a metallic support member 13 is joined to a porous metal matrix member 11 by a bond portion 17. Also shown are a heater filament 19 and an insulative spacer member 21 similar to that shown in Fig. 1. We have found that the bond portion 17 gives excellent adherence and thermionic contact and that the porous metal matrix member 11 need no further support. A particular size that has been found suitable in one embodiment of a cathode similar to that shown in Fig. 2 includes a porous metal matrix member 11 having a diameter 0.100 inch and a thickness of 0.030 inch, a metallic support member 13 having a diameter of 0.120 inch and the insulative spacer member 21 being spaced a distance of approximately 0.100 inch from the bond portion 17 at the end of the metallic support member 13.

Of course, the method derived in the subject application may also be used with flat tubular cathodes or other various types of tubes as used in receiving tubes, cathode ray tubes, vidicons, image orthicons, disc seal tubes, etc. Also the invention may, of course, be used in various metal to metal joints mentioned above.

For example, one application in which this invention may be used is that of relays in which one contact is similar to a fine porous metallic wool pad member and the other contact is a solid metallic rod member. This rod member is pressed into the pad member by the motion of the relay armature, thus establishing electrical contact between the rod and the pad.

It has been found to be difficult to fasten the pad member to a metallic support member because if ordinary soldering or brazing material is used, it is pulled into the pad member by capillary action during the time when the soldering or brazing material is molten. Upon cooling, the soldering or brazing material solidifies and the pad member becomes a hard inelastic mass.

If a reducible metallic oxide is used as a brazing agent as described above, a good mechanical and electrical bond is formed without saturating the porous pad member and thereby making it useless.

In a specific example, a suitable pad member may be made of 0.003 inch diameter nickel wire which has a thin coating of electrodeposited gold. A support member made of a suitable metal, such as nickel, is coated with from five to ten thousandths of an inch of a nickelic oxide and nitrocellulose slurry similar to the slurry disclosed above.

Next the pad member is placed in position on the slurry and the assembly is allowed to dry, which process may include heating if desirable. The assembly may then be fired in a suitable reducing atmosphere, such as dry hydrogen at a suitable temperature for a suitable time. I have found that a fifteen minute firing at a temperature between 700° C. and 800° C. results in a satisfactory joint.

While the present invention has been shown in a few forms only, it will be obvious to those skilled in the art that it is not so limited, but is susceptible of various changes and modifications without departing from the spirit and scope thereof.

I claim as my invention:

1. In the process of joining a porous metal matrix member to a metallic support member in a thermionic cathode suitable for use in an electron discharge device, the steps comprising forming a mixture consisting essentially of a thermally removable non-reactive organic binder material and a metallic oxide selected from at least one of the group consisting of the oxides of nickel, cobalt and iron, coating said mixture on at least one of said porous metal matrix member and said support member in the area where said members are to be joined, placing said members in the position in which they are to be joined, heating said members, at least part of said heating step being performed in a reducing atmosphere, so that all of the binder material is removed and substantially all of said metallic oxide is directly reduced to the pure metal without reaching the melting point of the reduced metal thereby joining said porous metal matrix member and support member with a high-melting-point metallic bond.

2. In the process of joining metal members, the steps comprising forming a mixture consisting essentially of a thermally removable organic binder material and a metallic oxide selected from at least one of the group consisting of the oxides of nickel, cobalt and iron, coating said mixture on at least one of said metal members in the area where said members are to be joined, placing the members in the position in which they are to be joined, heating said members, at least part of said heating step being performed in a reducing atmosphere, so that substantially all of said metallic oxide is reduced to a pure metal without reaching the melting point of the reduced metal thereby joining said metal members with a high-melting-point metallic bond.

3. In the process of joining a porous metallic matrix member consisting substantially of nickel to a metallic support member consisting substantially of nickel for use in a thermionic matrix cathode in an electron discharge device, the steps comprising forming a mixture consisting essentially of thermally removable organic binder material and nickelic oxide, coating said mixture on at least one of said porous matrix member and said support member in the area where said members are to be joined, placing said members in the position in which they are to be joined, drying said members, heating said members for about ten minutes at a temperature of about 700° C. in a reducing atmosphere, so that substantially all of said nickelic oxide is reduced to nickel thereby joining said porous metal matrix member and said metallic support member with a high-melting-point metallic bond.

References Cited in the file of this patent

UNITED STATES PATENTS

| | | |
|---|---|---|
| 2,627,110 | Hickey | Mar. 3, 1953 |
| 2,795,040 | Antel | Jan. 11, 1957 |
| 2,808,531 | Katz | Oct. 1, 1957 |
| 2,813,220 | Coppola | Nov. 12, 1957 |
| 2,822,609 | Horvitz | Feb. 11, 1958 |

OTHER REFERENCES

Kohl: "Materials Technology for Electron Tubes," page 461, Reinhold Pub. Corp., New York, 1951, V3K65.